Jan. 5, 1926.
W. A. FOSS
FISHING REEL
Filed Dec. 10, 1923
1,568,149
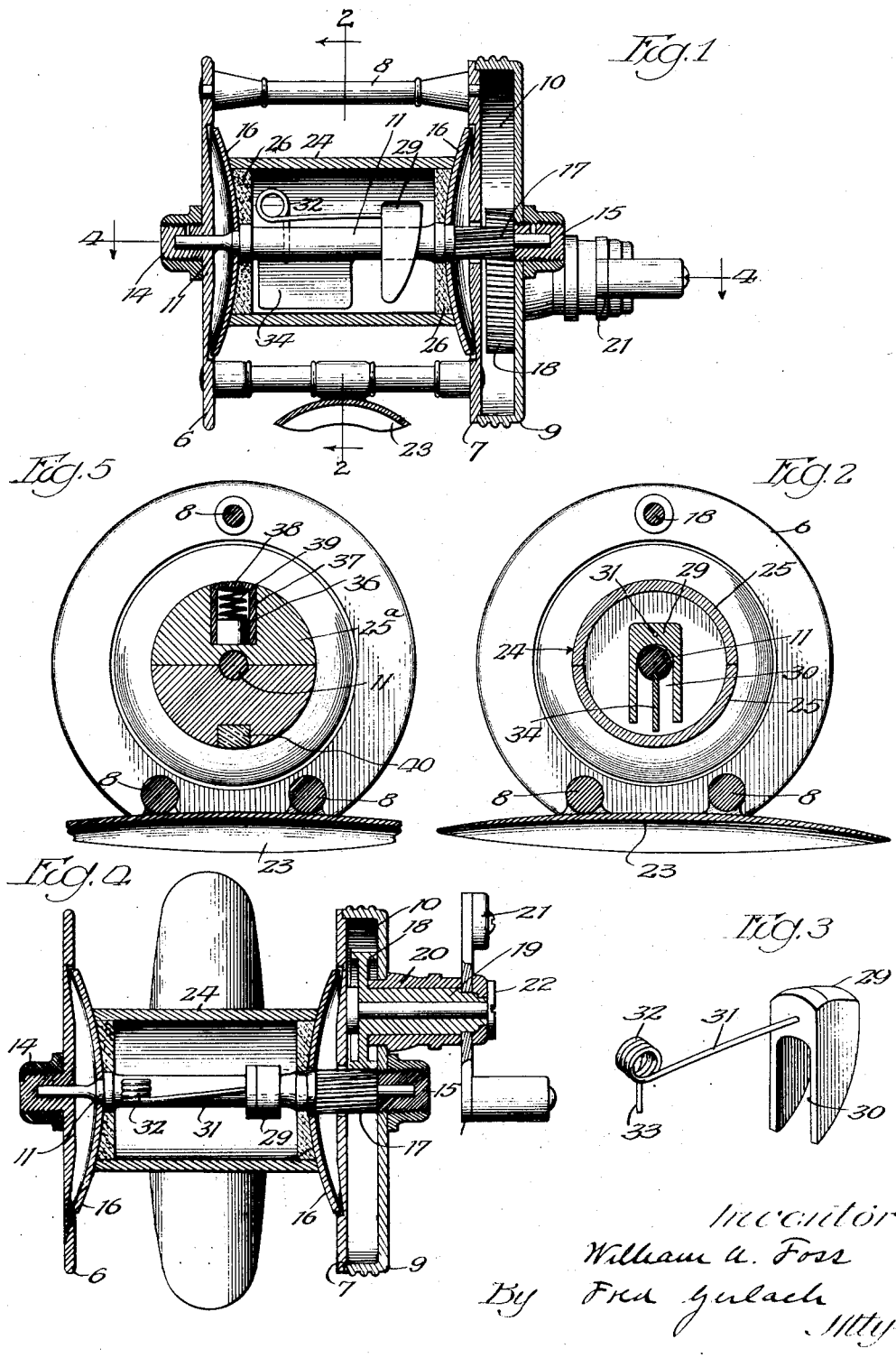

Patented Jan. 5, 1926.

1,568,149

UNITED STATES PATENT OFFICE.

WILLIAM A. FOSS, OF CLEVELAND, OHIO.

FISHING REEL.

Application filed December 10, 1923. Serial No. 679,546.

*To all whom it may concern:*

Be it known that I, WILLIAM A. Foss, a citizen of the United States, and a resident of Cleveland, in the county of Cuyahoga and State of Ohio, have invented certain new and useful Improvements in Fishing Reels, of which the following is a full, clear, and exact description.

The invention relates to fishing reels and its object is to prevent the line from becoming entangled or overrunning while casting. In practice, it has been a desideratum to provide a fishing reel in which automatic provision is made for this purpose without acting as sufficient drag upon the line or spool to substantially lessen the distance of the cast, and this object is attained in the present invention by providing a centrifugal governor which is rotatable with the spool and will automatically increase its resistance as the speed of the spool increases, so that it will prevent overrunning and the consequent tangling of the line in casting the bait when the fisherman does not apply thumb pressure to the spool. A further object of the invention is to provide improved means for controlling the line which is disposed inside of a cylinder on the spool. Other objects will appear from the detailed description.

The invention consists in the several novel features hereinafter set forth and more particularly defined by claims at the conclusion hereof.

In the drawings: Fig. 1 is a transverse axial section of a fishing reel embodying the invention. Fig. 2 is a section on line 2—2 of Fig. 1. Fig. 3 is a perspective of the centrifugal governor. Fig. 4 is a section taken on line 4—4 of Fig. 1. Fig. 5 is a transverse section, showing a modified form of the invention.

The invention is exemplified in a fishing reel comprising a frame consisting of side plates 6 and 7, rods 8 between and rigidly cross-connecting the plates and a cap 9 suitably connected to the frame to provide a chamber 10 for the gearing for driving the spool. A spool, on which the line is wound, comprises a shaft 11 having its terminals journalled in bearings 14 and 15 on the frame-side 6 and the cap 9 respectively and sides or flanges 16 which are rigidly secured to the shaft. The gearing for rotating the spool to wind up the line comprises a pinion 17 rigid with shaft 11, a gear-wheel 18 meshing with the pinion and integral with a hollow-shaft 19 which is journalled in a bearing 20 in cap 9, and a balanced crank 21 which is rigidly secured to shaft 19 by a screw 22. The frame is provided with a curved plate 23, whereby the reel may be secured to the rod by the usual slidable retaining band thereon. The frame, spool and gearing may be of any suitable construction, as well understood in the art.

In order to provide a body for the spool, on which the line is wound, of sufficient diameter to insure a free run in casting and to provide a chamber in the spool for containing the line-retarding means or governor, a cylinder 24, composed of semi-cylindrical sections 25, is concentrically secured to the spool and around shaft 11. Disks 26, which may be of cork, are split so they may be applied around shaft 11 and have outer faces shaped to fit against the inner faces of the spool-sides 16 respectively. The sections of cylinder 24 are preferably formed of wood and fit around the disks 26 and, after having been put in place on the disks, may have their contiguous edges united by glue or any other suitable means, so they will be firmly attached to the spool. This hollow cylinder exemplifies a construction which may be applied to the spool of usual construction.

A weight 29, preferably of metal and recessed, as at 30, to straddle the shaft 11, is yieldingly supported by the arm 31 of a coil spring 32 which has a terminal 33 extending through and anchored in the shaft 11 adjacent one of the disks 26. A vane 34 extends radially outward from the shaft 11 and is oppositely disposed to the spring 32.

In casting the bait, the line will rotate the spool and, as its speed increases, the weight 29 will be subjected to centrifugal force, varying according to the speed which will cause the weight to move outwardly against the force of spring 32, so its retarding effect will be increased correspondingly to the increase of speed of the spool. This weight is formed so that it will offer slight retardation to the spool when it is in its normal position, but is sufficiently overweighted at the spring side to cause it to respond to centrifugal force. The sides of the weight are flat and form a surface which, together with vane 34, cause the rotation of the spool to be atmospherically resisted to coact with the governor in controlling the speed of the spool.

In Fig. 5, there is shown a modification in which a supplemental cylinder is formed of solid sections 25ᵃ, usually of wood, fitting around the shaft 11, and the centrifugal governor consists of a weight 36 which is slidably mounted in a metallic socket 37, which has a closed outer end 38 and is rigidly held in one of the cylinder sections, and a coil spring 39 interposed between the weight 36 and the socket end 38. A weight 40 is secured in the cylinder oppositely to the governor to approximately counterbalance it and prevent excessive vibration. As the speed of the spool increases, the weight 36 will move outwardly against the force of spring 39 under the influence of centrifugal force and correspondingly to the speed of the spool. As the weight 36 moves outwardly under the influence of centrifugal force, it will progressively unbalance the spool, thus setting up vibration which will tend to retard the spool and line during a cast.

The invention exemplifies an automatic centrifugal governor for preventing the line from overrunning and becoming entangled in casting bait, and also a device in which both centrifugal force and atmospheric resistance are utilized in controlling the spool. The governor means set forth is adapted to be conveniently disposed in a hollow cylinder applied to a spool of usual construction.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a fishing reel, the combination of a frame adapted to be secured to a fishing rod, a spool rotatably mounted in the frame, means for operating the spool to wind a line thereon, and a centrifugal device substantially and constantly free to rotate without variation in the retardational engagement between the spool and frame and connected to the spool so its movement under centrifugal influence will vary its retardance of the spool.

2. In a fishing reel, the combination of a frame adapted to be secured to a fishing rod, a spool rotatably mounted in the frame, means for operating the spool to wind a line thereon, and a centrifugally movable weight substantially and constantly free to rotate without variation in the retardational engagement between the spool and frame and connected to unbalance the spool under centrifugal influence.

3. In a fishing reel, the combination of a frame adapted to be secured to a fishing rod, a spool rotatably mounted in the frame, means for operating the spool to wind a line thereon, and a centrifugal device substantially and constantly free to rotate without variation in the retardational engagement between the spool and frame and connected to progressively unbalance the spool under centrifugal influence.

4. In a fishing reel, the combination of a frame adapted to be secured to a fishing rod, a spool rotatably mounted in the frame, means for operating the spool to wind a line thereon, and a centrifugal device substantially and constantly free to rotate without variation in the retardational engagement between the spool and frame and rotating with and adapted to unbalance the spool and to set up vibration tending to retard the spool.

5. In a fishing reel, the combination of a frame adapted to be secured to a fishing rod, a spool rotatably mounted in the frame, means for operating the spool to wind a line thereon, and a centrifugally movable weight substantially and constantly free to rotate without variation in the retardational engagement between the spool and frame and rotating with and adapted to progressively unbalance the spool and to set up vibration tending to retard the spool.

6. In a fishing reel, the combination of a frame adapted to be secured to a fishing rod, a spool rotatably mounted in the frame, means for operating the spool to wind a line thereon, a centrifugal weight substantially and constantly free to rotate without variation in the retardational engagement between the spool and frame and a resilient supporting member between the weight and the spool which permits the weight to move responsively to centrifugal influence.

7. In a fishing reel, the combination of a frame adapted to be secured to a fishing rod, a spool rotatably mounted in the frame, means for operating the spool to wind a line thereon, a centrifugal weight substantially and constantly free to rotate without variation in the retardational engagement between the spool and frame and a supporting connection between the weight and the spool consisting of a spring-wire which permits the weight to move responsively to centrifugal influence.

8. In a fishing reel, the combination of a frame adapted to be secured to a fishing rod, a spool rotatably mounted in the frame and comprising flanges and a hollow cylinder, means for operating the spool to wind a line thereon, and a centrifugal device substantially and constantly free to rotate without variation in the retardational engagement between the spool and frame and for retarding the spool under centrifugal influence, disposed within the cylinder.

9. In a fishing reel, the combination of a frame adapted to be secured to a fishing rod, a spool rotatably mounted in the frame and comprising flanges and a hollow cylinder, means for operating the spool to wind a line thereon, and a weight substantially and constantly free to rotate without variation in the retardational engagement between the spool and frame and for retarding the spool under centrifugal influence, disposed within and rotating with the cylinder.

10. In a fishing reel, the combination of a frame adapted to be secured to a fishing rod, a spool rotatably mounted in the frame and comprising flanges and a hollow cylinder, means for operating the spool to wind a line thereon, a weight substantially and constantly free to rotate without variation in the retardational engagement between the spool and frame and for retarding the spool under centrifugal influence, disposed within the cylinder, and a resilient support for the weight also disposed in said cylinder.

11. In a fishing reel, the combination of a frame adapted to be secured to a rod, a spool rotatably mounted in the frame, means for operating a spool to wind a line thereon, a centrifugal device substantially and constantly free to rotate without variation in the retardational engagement between the spool and frame and to retard the spool in casting, and a vane rotating with the spool to produce atmospheric retardation.

12. In a fishing reel, the combination of a frame adapted to be secured to a rod, a spool rotatably mounted in the frame, means for operating a spool to wind a line thereon, a centrifugal device substantially and constantly free to rotate without variation in the retardational engagement between the spool and frame and to retard the spool in casting, and a vane to produce atmospheric retardation, said device and vane being disposed inside of the spool.

Signed at Cleveland, Ohio, this 26th day of November, 1923.

WILLIAM A. FOSS.